United States Patent
Sarangi et al.

(10) Patent No.: US 11,425,628 B2
(45) Date of Patent: Aug. 23, 2022

(54) METHOD AND SYSTEM FOR ACHIEVING AUTO ADAPTIVE CLUSTERING IN A SENSOR NETWORK

(71) Applicant: Tata Consultancy Services Limited, Mumbai (IN)

(72) Inventors: Sanat Sarangi, Thane (IN); Srinivasu Pappula, Hyderabad (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 18 days.

(21) Appl. No.: 16/099,936

(22) PCT Filed: May 8, 2017

(86) PCT No.: PCT/IB2017/052658
§ 371 (c)(1),
(2) Date: Nov. 8, 2018

(87) PCT Pub. No.: WO2017/195089
PCT Pub. Date: Nov. 16, 2017

(65) Prior Publication Data
US 2019/0141604 A1 May 9, 2019

(30) Foreign Application Priority Data
May 9, 2016 (IN) .............................. 201621016128

(51) Int. Cl.
*H04W 40/32* (2009.01)
*H04W 52/02* (2009.01)
*H04W 84/18* (2009.01)

(52) U.S. Cl.
CPC ........... *H04W 40/32* (2013.01); *H04W 52/02* (2013.01); *H04W 84/18* (2013.01)

(58) Field of Classification Search
None
See application file for complete search history.

(56) References Cited

U.S. PATENT DOCUMENTS

| 7,035,240 B1 | 4/2006 | Balakrishnan et al. |
| 8,811,188 B1 | 8/2014 | Bagchi et al. |

(Continued)

FOREIGN PATENT DOCUMENTS

| GB | 473061 | 10/1937 |
| WO | WO 2006/038163 | 4/2006 |

(Continued)

OTHER PUBLICATIONS

International Search Report dated Aug. 10, 2017, in International Application No. PCT/IB2017/052658; 2 pages.

(Continued)

*Primary Examiner* — Jutai Kao
(74) *Attorney, Agent, or Firm* — Finnegan, Henderson, Farabow, Garrett & Dunner LLP

(57) ABSTRACT

A system and method for achieving auto-adaptive clustering in a sensor network has been explained. The system performs a hierarchical clustering in sensor networks to maximize the lifetime of the network. The system includes a set of sensor nodes and a sink node. The clusters in sensor networks are formed automatically from a large number of deployed nodes where the cluster characteristics are driven by the measurement requirements defined by the end-user. The system also employs a clustering algorithm to achieve adaptive clustering. The processor further includes a first level clustering module for grouping the set of sensor nodes into data level clusters based on the measurements. The processor further includes a second level clustering module for grouping the set of sensor nodes in the data level clusters into the location level clusters based on location. In another embodiment, that clustering can go on to more than two levels.

12 Claims, 3 Drawing Sheets

(56) References Cited

U.S. PATENT DOCUMENTS

| | | | |
|---|---|---|---|
| 2007/0019569 A1* | 1/2007 | Park | H04W 40/32 |
| | | | 370/254 |
| 2008/0253327 A1 | 10/2008 | Kohvakka et al. | |
| 2009/0154395 A1 | 6/2009 | Park et al. | |
| 2010/0064532 A1 | 3/2010 | Wittke et al. | |
| 2012/0014289 A1 | 1/2012 | Ortega et al. | |
| 2013/0128786 A1* | 5/2013 | Sultan | H04W 52/0238 |
| | | | 370/311 |
| 2014/0047242 A1 | 2/2014 | Ukil et al. | |
| 2015/0208464 A1* | 7/2015 | Heo | H04W 4/70 |
| | | | 702/189 |

FOREIGN PATENT DOCUMENTS

| | | | |
|---|---|---|---|
| WO | WO-2006038163 A1 * | 4/2006 | G01D 21/00 |
| WO | WO 2007/060698 | 5/2007 | |

OTHER PUBLICATIONS

Written Opinion dated Aug. 10, 2017, in International Application No. PCT/IB2017/052658; 5 pages.

\* cited by examiner

METHOD AND SYSTEM FOR ACHIEVING AUTO ADAPTIVE CLUSTERING IN A SENSOR NETWORK

PRIORITY CLAIM

This U.S. patent application claims priority under 35 U.S.C. § 119 to: India Application No. 201621016128, filed on May 9, 2016. The entire contents of the aforementioned application are incorporated herein by reference

TECHNICAL FIELD

The embodiments herein generally relates to the field of wireless sensor networks, and, more particularly, to a method and system for achieving auto-adaptive clustering in a sensor network in an energy efficient manner using end-user information-level attributes as a criteria for clustering.

BACKGROUND OF THE INVENTION

A wireless sensor network is a technology that detects a behavior and an environment of a target by utilizing sensors disposed in a predetermined region, converting the detected information into data, and wirelessly transmitting the data to a sink node collecting data. Generally, a sensor network consists of a set of physical nodes that monitor a geographical region for one or more parameters and send the sensed values to a central gateway (also called as a sink) that manages the network. Clustering and data aggregation in a sensor networks have so far grouped sensor nodes based on physical characteristics such as location and mobility so that the sensed data could be aggregated and transmitted to the sink saving energy in the process. The sensor networks are getting integrated into the larger fabric of Internet of Things (IoT) with a large number of target applications with varying requirements. Existing clustering methods are not adaptive to the characteristics of the sensing objective. In order to solve the problems, research of the sensor network and a data aggregating technology for efficient deployment planning is being conducted.

Clustering in sensor networks and IoT systems have so far primarily worked with physical parameters associated with clustering such as position and mobility. Nodes in a typical sensor network deployment are redundant in number, and it is not essential that all sensor nodes are tasked for every sensing requirement. The requirement of more recent sensor network and IoT applications is to monitor systems with a certain service level agreement (SLA) for the sensing objective, for example, to monitor the variations in the values of a parameter across a region in an energy efficient manner.

A lot of prior art techniques have been used in the part in the context of clustering in sensor networks and IoT. They primarily use physical characteristics to perform clustering. Some work on using application specific characteristics such as tags associated with data have been used to perform optimized data transmission. Work in prior art have not reported to carry out application adaptive clustering and organization of sensor networks where precision of measurement levels are used as a basis for adaptation and organization of nodes in the network.

SUMMARY OF THE INVENTION

The following presents a simplified summary of some embodiments of the disclosure in order to provide a basic understanding of the embodiments. This summary is not an extensive overview of the embodiments. It is not intended to identify key/critical elements of the embodiments or to delineate the scope of the embodiments. Its sole purpose is to present some embodiments in a simplified form as a prelude to the more detailed description that is presented below.

In view of the foregoing, an embodiment herein provides a system for achieving auto-adaptive clustering in a sensor network. The system comprises a set of sensor nodes, a user interface, a sink node, memory and a processor. The set of sensor nodes configured to measure a plurality of parameters, wherein each of the sensor nodes comprising a plurality of sensors present at a plurality of locations in an area. The user interface generates a request by a user to send the measured plurality of parameters. The sink node receives the plurality of parameters measured by the set of sensor nodes. The processor further comprises a first level clustering module, a second level clustering module, a designating module and a conveying module. The first level clustering module performs a first level clustering for grouping the set of sensor nodes into data level clusters based on the measured plurality of parameters. The second level clustering module performs a second level clustering for grouping the set of sensor nodes in the data level clusters into location level clusters based on the plurality of locations. The designating module designates a cluster head after the data and location level clustering to arrive at a clustering decision. The conveying module conveys the clustering decision back to the set of sensor nodes to adaptively rearrange them in clusters.

In another aspect, a method for achieving auto-adaptive clustering in a sensor network is provided. Initially in the method a plurality of parameters is measured by a set of sensor nodes, wherein each of the sensor nodes comprising a plurality of sensors present at a plurality of locations in an area. At the next step, a request is sent by a user interface, to the set of sensor nodes to send the plurality of parameters measured at a plurality of sensor nodes. Further, the plurality of parameters are sent to a sink node in response to the request. At the next step, a first level clustering is performed by a processor, for grouping the set of sensor nodes into data level clusters based on the measured plurality of parameters. Also, a second level clustering is performed by the processor, for grouping the set of sensor nodes in the data level clusters into location level clusters based on the plurality of locations. At the next step a node is designated by the processor for each of the clusters formed after the data level and location level clustering as a cluster head to arrive at a clustering decision. And finally, the clustering decision is conveyed back to the set of sensor nodes to adaptively rearrange the set of sensor nodes in clusters.

In yet another aspect, a non-transitory computer-readable medium having embodied thereon a computer program for executing for achieving auto-adaptive clustering in a sensor network is provided. Initially in the method a plurality of parameters is measured by a set of sensor nodes, wherein each of the sensor nodes comprising a plurality of sensors present at a plurality of locations in an area. At the next step, a request is sent by a user interface, to the set of sensor nodes to send the plurality of parameters measured at a plurality of sensor nodes. Further, the plurality of parameters are sent to a sink node in response to the request. At the next step, a first level clustering is performed by a processor, for grouping the set of sensor nodes into data level clusters based on the measured plurality of parameters. Also, a second level clustering is performed by the processor, for grouping the set of sensor nodes in the data level clusters into location level clusters based on the plurality of locations. At the next step a node is designated by the processor for each of the clusters formed after the data level and location level clustering as a cluster head to arrive at a clustering decision. And finally, the clustering decision is conveyed back to the set of sensor nodes to adaptively rearrange the set of sensor nodes in clusters.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

BRIEF DESCRIPTION OF THE DRAWINGS

The embodiments herein will be better understood from the following detailed description with reference to the drawings, in which.

DETAILED DESCRIPTION OF EMBODIMENTS

Figure 1:
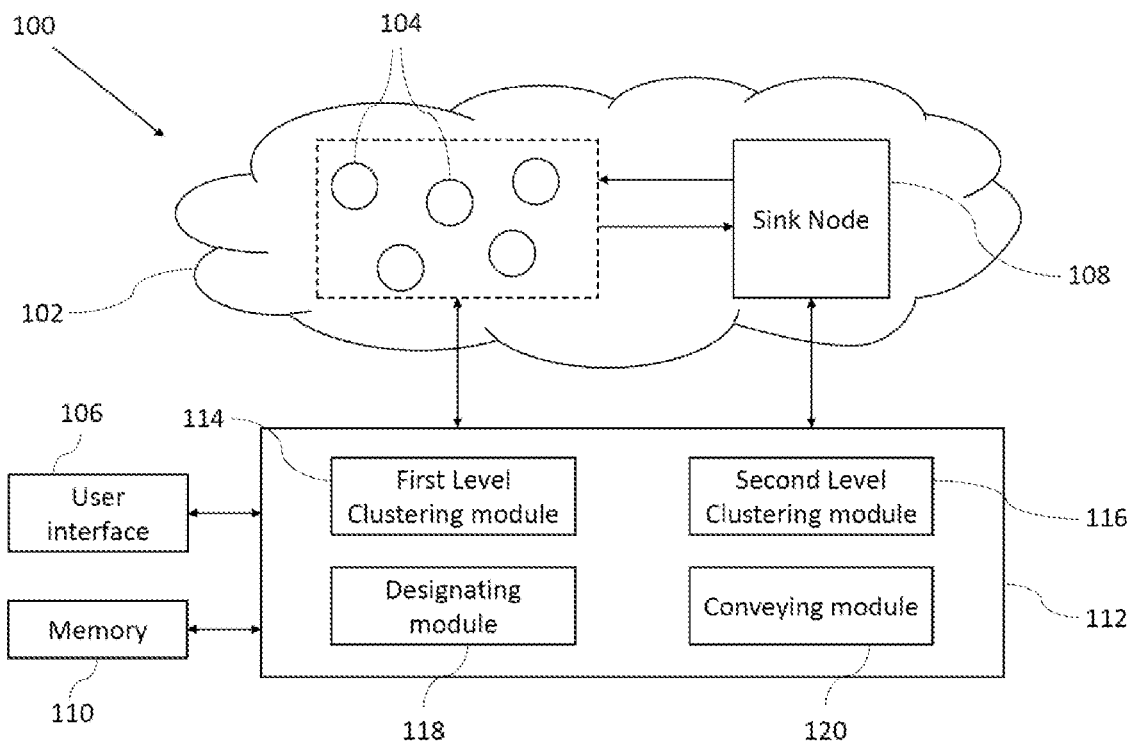
FIG. 1 illustrates a block diagram for achieving auto-adaptive clustering in a sensor network according to an embodiment of the present disclosure.

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Glossary—Terms Used in the Embodiments

The expression "sensor network" in the context of the present disclosure refers to a network of interconnected sensor used in any field of the invention. For example in farming, IoT or any other technology.

The expression "set of sensor nodes" or "sensor node" in the context of the present disclosure refers to particular location where plurality of sensors are present. The sensor node are chosen specifically depending on the area where the sensor network is deployed.

The expression "sink node" in the context of the present disclosure refers to the particular location. The sink node acts as a gateway to the external environment Referring now to the drawings, and more particularly to FIG. 1 through FIG. 3, where similar reference characters denote corresponding features consistently throughout the figures, there are shown preferred embodiments and these embodiments are described in the context of the following exemplary system and/or method.

According to an embodiment of the disclosure, a system 100 for achieving auto-adaptive clustering in a sensor network 102 is shown in FIG. 1. The system 100 automatically adapts the energy efficient hierarchical clustering in the sensor network 102 to maximize the lifetime of the sensor network 102. The clusters in sensor networks are formed automatically from a large number of deployed nodes where the cluster characteristics are driven by the measurement requirements defined by the end-user. The present disclosure uses end-user information-level attributes as a criteria for clustering.

Figure 2:
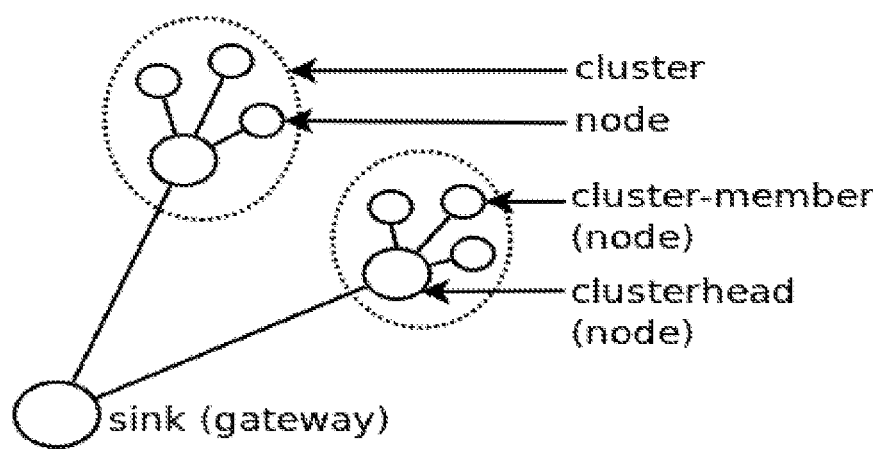
FIG. 2 illustrates a sensor network deployment setup according to an embodiment of the present disclosure.

According to an embodiment of the disclosure, the system 100 consists of a set of sensors nodes 104, a user interface 106, a sink node 108, a memory 110 and a processor 112 as shown in FIG. 1. The set of sensor nodes 104 and the sink node 108 are in communication with the processor 108. The set of sensor nodes 104 are deployed for monitoring an area. The set of sensor nodes 104 can monitor particular regions in a field. The sink node 108 acts as a gateway for these nodes with the external world. A plurality of sensors (not shown) may be present in the set of sensor nodes 104. In an example, the plurality of sensors can be attached to a person working in the field. In another example, it should be appreciated that the plurality of sensors may also be present independently on the field, capturing the data on the field. A typical sensor network 102 deployment normally consists of the set of sensor nodes 104 talking to the sink node 108 or gateway that manages the network as shown in FIG. 2.

The processor 112 is in communication with the memory 110. The processor 112 configured to execute an algorithm stored in the memory 110. The algorithm is executed on the sink node 108 and orchestrates the set of sensor nodes 104 in a specific fashion to achieve hierarchical application specific clustering. To achieve this, the set of sensor nodes 104 monitor an area and send the raw measurements to the sink node 108. The set of sensor nodes 104 configured to measure a plurality of parameters, wherein each of the sensor nodes comprising a plurality of sensors present at a plurality of locations in an area.

According to an embodiment of the disclosure, the user interface 106 is configured to generate a request to send the measured plurality of parameters measured at the set of sensor nodes 104. The user interface 106 is operated by a user. The user interface 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the user interface 106 can include one or more ports for connecting a number of devices to one another or to another server.

Based on the request generated by the user interface 106, the sink node 108 receives the plurality of parameters measured by the set of sensor nodes 104. The sink node 108 has a predefined service level agreement (SLA) in terms of precision of monitoring requirements for the region covered by the set of sensor nodes 104. The sink node 108 uses the hierarchical clustering algorithm to find the final clusters for the set of sensor nodes 104. The clustering information is conveyed to the nodes in the sensor network 102 so that they orient themselves accordingly and send the measurements to the sink node 106.

According to an embodiment of the disclosure, the processor 112 further includes a plurality of modules for performing functions. The processor 112 may include a first level clustering module 114, a second level clustering module 116. The processor 112 is configured to process the measured parameters to arrive at a clustering decision. The first level clustering module 114 performs a first level clustering for grouping the set of sensor nodes 104 into data level clusters based on the measured plurality of parameters. The measurement from each of the sensor nodes 104 are taken through a transformation function. The output of the transformation function is used to form clusters where nodes in a cluster have similar measurements. As an example, nodes with outputs within a certain threshold can be considered as belonging to same cluster.

According to another embodiment of the disclosure, the second level clustering module 116 performs a second level clustering for grouping the set of sensor nodes 104 in the data level clusters into the location level clusters based on the plurality of locations. The location of each of the nodes is used as a criteria for sub-clustering each clusters into further clusters. The cluster formed after this process have two characteristics for nodes: measurements at similar levels and location close to each other. The process of auto-adaptive clustering is also explained with the help of an example in the later part of this disclosure. It should be appreciated that the clustering is not limited to two levels, in another embodiments, the clustering can go on to more than two levels and is not restricted to 2 levels.

According to an embodiment of the disclosure, the designating module 118 designates a cluster head after the data and location level clustering to arrive at a clustering decision. The conveying module 120 then further conveys the clustering decision back to the set of sensor nodes 104 to adaptively rearrange the set of sensor nodes 104 in clusters. According to another embodiment of the disclosure, the clustering can also happen at more than two levels, wherein each level depend on the plurality of parameters and the plurality of locations.

According to an embodiment of the invention, the first level and the second level clustering module 114 and 116 executes a clustering algorithm called as adaptive data centric clustering algorithm (ADCS) which combines unsupervised learning with an n-level hierarchical data fusion and transfer mechanism to achieve energy efficiency in the network. The ADCS adjusts to the nature, size and cluster-member numbers based on application level measurement characteristics. With ADCS, contextual clustering was introduced where size of clusters in terms of number of covered nodes within each cluster is governed by the precision of monitoring requirements as defined by the monitoring/sensing objectives defined by the end user. The clustering is achieved by statistically measuring the similarity levels between measurements from nodes as one of its steps to carry out clustering in order to maximize the network lifetime ADCS is executed on the sink node/gateway and is generic enough to allow a variety of analytical models to be used to achieve the contextual clustering. Once the clusters are finalized at the gateway, they are sent back to the network for configuration. Dynamically changing conditions such as this render themselves to modeling with unsupervised learning models for analysis.

According to another embodiment of the disclosure, three variants of ADCS algorithm can be used ADCS-DB, ADCS-KM, and ADCSAG (DBSCAN, K Means and Agglomerative) where each variant uses a different algorithm for unsupervised clustering. More such variants can be derived based on the clustering requirements. For example, a requirement to measure the temperature of a region with a mean m and with a certain standard deviation s may form a cluster of a certain size S covering a set of nodes n. If the standard-deviation is relaxed to 2 s, ADCS may expand the cluster size to include more nodes.

Figure 3A:
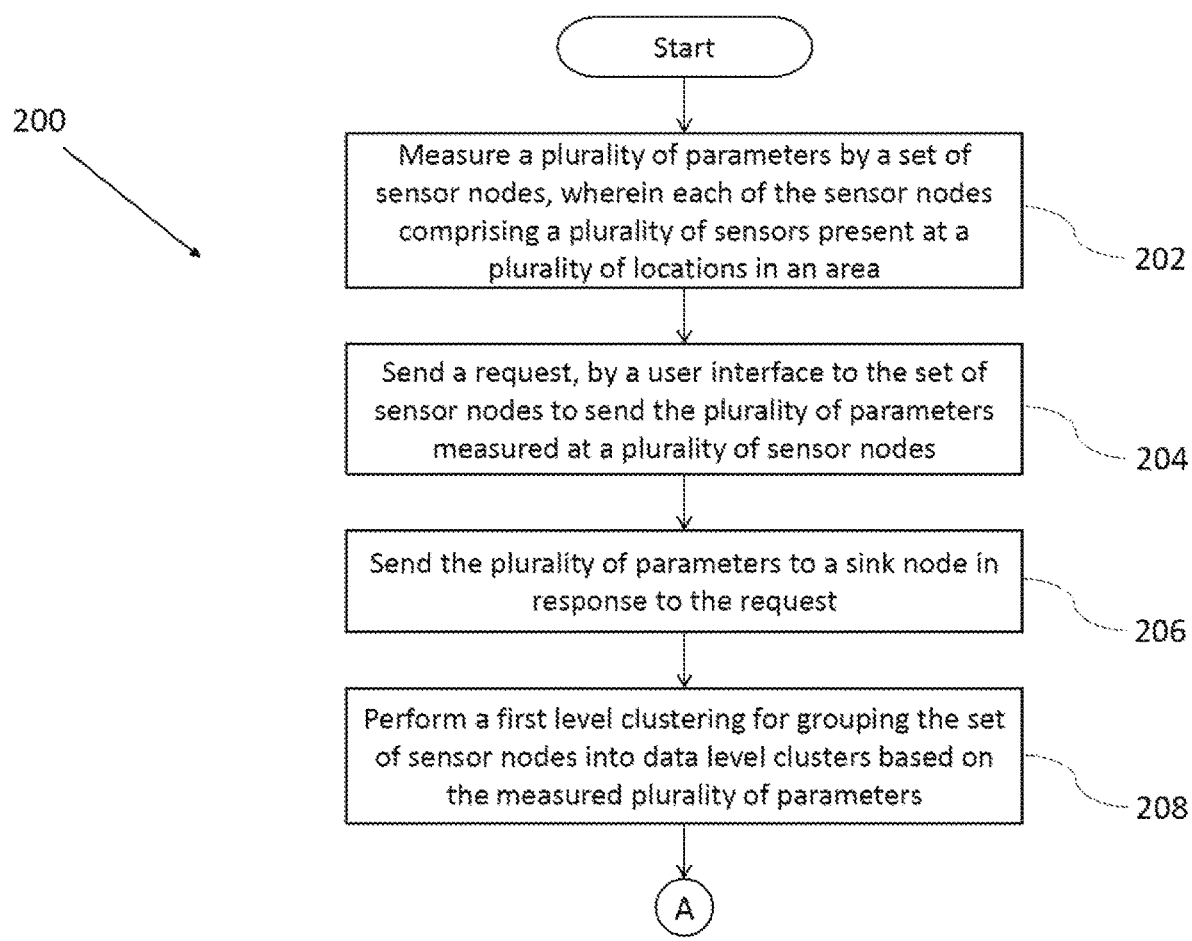
FIG. 3 is a flowchart illustrating the steps involved for achieving auto-adaptive clustering in a sensor network according to an embodiment of the present disclosure.
Figure 3B:
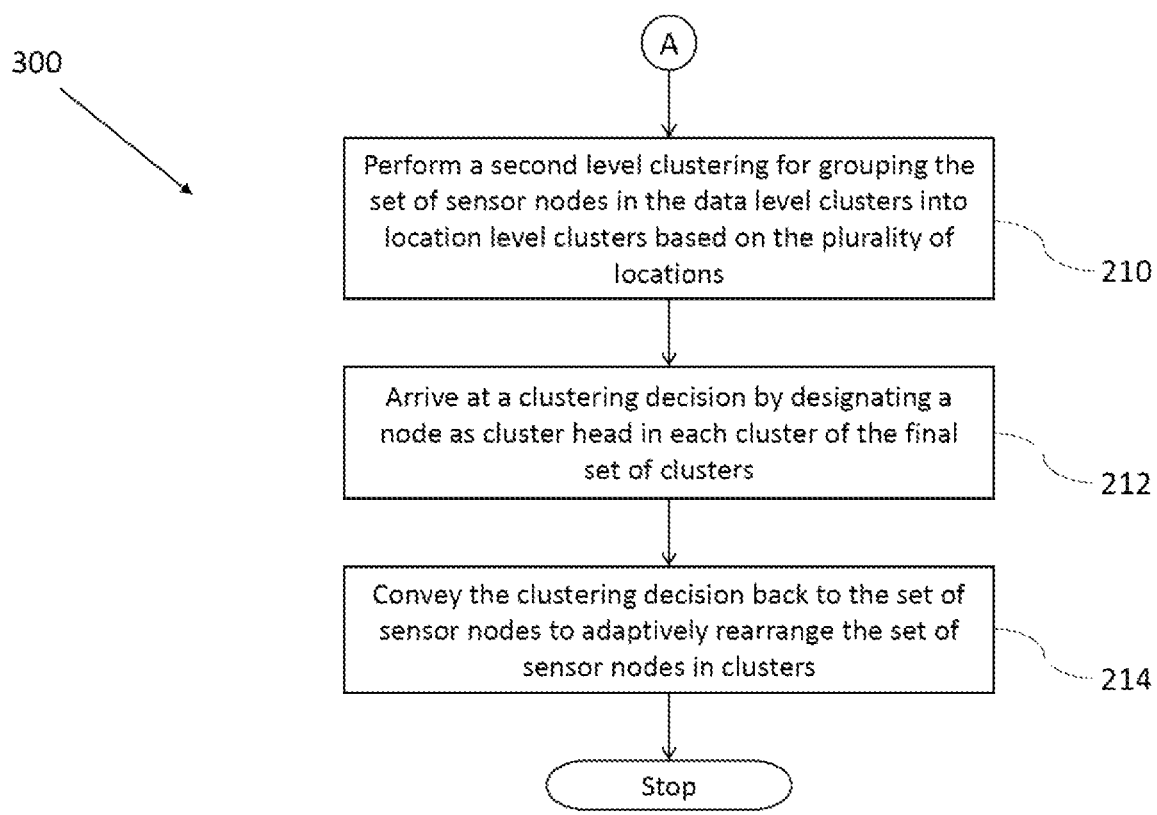

In operation, a flowchart 200 illustrating the steps involved for achieving auto-adaptive clustering in the sensor network 102 is shown in FIG. 3. Initially at step 202, a plurality of parameters are measured by a set of sensor nodes 104. Each of the set of sensor nodes 104 comprising a plurality of sensors present at a plurality of locations in an area. The plurality of sensors are configured to measure various parameters of the person or the plurality of locations in the area. At next step 204, a request is sent by the user interface 106 to the set of sensor nodes 104 to send the plurality of parameters measured at a plurality of sensor nodes. At step 206, the plurality of parameters are sent to the sink node 108 in response to the request;

At the next step 208 a first level clustering is performed by the first level clustering module 114 for grouping the set of sensor nodes 104 into data level clusters based on the measured plurality of parameters. Similarly at step 210, a second level clustering is performed by the second level clustering module 116 for grouping the set of sensor nodes in the data level clusters into location level clusters based on the plurality of locations. It should be appreciated that clustering can go on to more than two levels and is not restricted to two levels. At step 212, the data level clusters are further divided into location level clusters and one of the nodes in each cluster is designated as a cluster head using the designating module 118. And finally at step 214, the clustering decision is conveyed back to the set of sensor nodes 104 to adaptively rearrange the set of sensor nodes in clusters.

According to an embodiment of the disclosure, the system 100 can be explained with the help of the following example. A region R covered by a set of S sensor nodes where each node s (i) ∈ S measures a parameter regularly at a given interval. Let V (i) denote a set of n measurements {v (1), . . . , v(n)} i from sensor node s (i). For any two s (i), s (j) ∈ S where the data points of V (i) have the same trend as V (j), the location and field characteristics of the two nodes determine whether they could be considered as measuring the same or different conditions. For example, if s (i), s (j) are geographically separated by a large distance, the similarity in the observed values could be a temporal coincidence. On the other hand, even if the nodes are placed near each other, a difference in elevation or overhead vegetation (such as a camouflage) would govern whether the observed trends remain the same or change over time. There could be several such constraints which govern the extent of similarity and hence clustering. Further, the conditions around the nodes may change over time so the clustering decision taken at a given point of time would change at regular intervals. For clarity, the ADCS algorithm have been discussed with clustering at two levels, L0 and L1, where L0 is at the data level and L1 at the location level. The principle is generic enough to extend to any number of levels.

ADCS assumes an n node WSN deployment with a sink (gateway) as an end point. The ADCS algorithm executes on the sink. It starts with the sink requesting all nodes to send their data. The data is processed at the sink to arrive at a clustering decision which is then conveyed back to the network nodes. It was noted that the network nodes could send their data to sink by direct transmission or route it through other nodes in the network. For clarity it was assumed that a direct transmission strategy where a clustering decision implies a set of clusters each with a cluster head and some cluster members. Cluster members transmit to cluster head and cluster head sends to the sink. Clustering at the gateway level incurs a computational overhead which is a function $f$ of the number of nodes in the network. The order of f is dependent on the criteria for degree of similarity of measured data carried out for L0 clustering.

The first step after input set generation is L0 clustering to identify the nodes at similar data-levels. This step gives the scope for any unsupervised clustering method to be used. The clusters identified in this manner may be geographically scattered. The input set is passed through an L1 cluster which clusters those nodes that are within certain physical separation of each other. Again there are two ways to achieve this: predefined boundaries and unsupervised clustering spaces. In the absence of predefined boundaries, unsupervised clustering is carried out to achieve this second-level clustering. Cluster heads are chosen randomly after L1 clustering. It is possible for some nodes to get left out during the L0 and L1 clustering process.

Effectively, an adaptive clustering framework was created with ADCS which is generic enough to allow a variety of models to be used. Once the clusters are finalized at the sink (gateway), they are sent back to the network for configuration.

According to an embodiment of the present disclosure, the system 100 was simulated with different versions of the learning models and a comparison is finally drawn and presented. Further, due to aforementioned reasons the nature of data is likely to change over time. Multiple rounds of simulation were performed with changing data values to establish the results. Dynamically changing conditions such as this render themselves to modeling with unsupervised learning models. ADCS has been configured to use various unsupervised learning algorithms to carry out L0 and L1 clustering.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein addresses unresolved problem of clustering in sensor networks and IoT. The embodiment, thus provides a system and method for achieving an auto-adaptive clustering in the sensor network.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus to various devices such as a random access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

The preceding description has been presented with reference to various embodiments. Persons having ordinary skill in the art and technology to which this application pertains will appreciate that alterations and changes in the described structures and methods of operation can be practiced without meaningfully departing from the principle, spirit and scope.

What is claimed is:

1. A method for achieving auto-adaptive clustering in a sensor network, the method comprising:
measuring a plurality of parameters by a set of sensor nodes, wherein each of the sensor nodes comprising a plurality of sensors present at a plurality of locations in an area;
sending a request, by a user interface, to the set of sensor nodes to send the plurality of parameters measured at the set of sensor nodes;
sending the plurality of parameters to a sink node in response to the request;
performing a first level clustering, by a processor at the sink node, for grouping the set of sensor nodes into data level clusters based on the measured plurality of parameters;
performing a second level clustering, by the processor at the sink node, for grouping the set of sensor nodes in the data level clusters into location level clusters based on the plurality of locations, wherein location of each of the set of sensor nodes is used as a criteria for sub-clustering each of the data level clusters into the location level clusters, wherein the first level and the second level clustering is based on an Adaptive Data Centric Clustering (ADCS) algorithm, wherein the ADCS algorithm is configured to use unsupervised learning algorithms for performing the first level clustering and the second level clustering, wherein the clustering is achieved by statistically measuring similarity levels between measurements from the set of sensor nodes, wherein the clustering is performed on a predefined service level agreement (SLA) pertaining to precision of monitoring for the area covered by the set of sensor nodes, and wherein each of the set of sensor nodes in each of the location level clusters include characteristics of measurements at similar levels and location close to other sensor nodes;
designating, by the processor at the sink node, a node in each of the data level clusters and location level clusters as a cluster head to arrive at a clustering decision; and
conveying, by the processor at the sink node, the clustering decision back to the set of sensor nodes to adaptively rearrange the set of sensor nodes in clusters.

2. The method of claim 1, wherein the ADCS algorithm adjusts to nature of the cluster, size of the cluster and cluster member numbers.

3. The method of claim 1, wherein the ADCS algorithm is performed on the sink node.

4. The method of claim 1 further configured to allow the use of multiple algorithms to cluster in order to achieve improved performance.

5. A system for achieving auto-adaptive clustering in a sensor network, the system comprises:
a set of sensor nodes configured to measure a plurality of parameters, wherein each of the sensor nodes comprising a plurality of sensors present at a plurality of locations in an area;
a user interface for generating a request by a user to send the measured plurality of parameters;
a sink node for receiving the plurality of parameters measured by the set of sensor nodes;
a memory; and
a processor in communication with the memory, the processor further comprising:
a first level clustering module for performing a first level clustering for grouping the set of sensor nodes into data level clusters based on the measured plurality of parameters;
a second level clustering module for performing a second level clustering for grouping the set of sensor nodes in the data level clusters into location level clusters based on the plurality of locations, wherein location of each of the set of sensor nodes is used as a criteria for sub-clustering each of the data level clusters into the location level clusters, wherein the first level and the second level clustering is based on an Adaptive Data Centric Clustering (ADCS) algorithm, wherein the ADCS algorithm is configured to use unsupervised learning algorithms for performing the first level clustering and the second level clustering, wherein the clustering is achieved by statistically measuring similarity levels between measurements from the set of sensor nodes, wherein the clustering is performed on a predefined service level agreement (SLA) pertaining to precision of monitoring for the area covered by the set of sensor nodes, and wherein each of the set of sensor nodes in each of the location level clusters include characteristics of measurements at similar levels and location close to other sensor nodes;
a designating module for designating a cluster head after the data and location level clustering to arrive at a clustering decision; and
a conveying module for conveying the clustering decision back to the set of sensor nodes to adaptively rearrange the set of sensor nodes in clusters.

6. The system of claim 5, wherein each of the set of sensor nodes are in electrical communication with the plurality of sensors.

7. The system of claim 5, wherein the sink node is configured to be used as a gateway to external environment.

8. The system of claim 5, wherein the clustering can also happen at more than two levels, wherein each level depends on the plurality of parameters and the plurality of locations.

9. One or more non-transitory machine readable information storage mediums comprising one or more instructions which when executed by one or more hardware processors cause:
measuring a plurality of parameters by a set of sensor nodes, wherein each of the sensor nodes comprising a plurality of sensors present at a plurality of locations in an area;
sending a request, by a user interface, to the set of sensor nodes to send the plurality of parameters measured at the set of sensor nodes;
sending the plurality of parameters to a sink node in response to the request;
performing a first level clustering, by a processor at the sink node, for grouping the set of sensor nodes into data level clusters based on the measured plurality of parameters;
performing a second level clustering, by the processor at the sink node, for grouping the set of sensor nodes in the data level clusters into location level clusters based on the plurality of locations, wherein location of each of the set of sensor nodes is used as a criteria for sub-clustering each of the data level clusters into the location level clusters, wherein the first level and the second level clustering is based on an Adaptive Data Centric Clustering (ADCS) algorithm, wherein the ADCS algorithm is configured to use unsupervised learning algorithms for performing the first level clustering and the second level clustering, wherein the clustering is achieved by statistically measuring similarity levels between measurements from the set of sensor nodes, wherein the clustering is performed on a predefined service level agreement (SLA) pertaining to precision of monitoring for the area covered by the set of sensor nodes, and wherein each of the set of sensor nodes in each of the location level clusters include characteristics of measurements at similar levels and location close to other sensor nodes;

designating, by the processor at the sink node, a node in each of the data level clusters and location level clusters as a cluster head to arrive at a clustering decision; and conveying, by the processor, the clustering decision back to the set of sensor nodes to adaptively rearrange the set of sensor nodes in clusters.

10. The one or more non-transitory machine readable information storage mediums of claim 9, wherein the ADCS algorithm adjusts to nature of the cluster, size of the cluster and cluster member numbers.

11. The one or more non-transitory machine readable information storage mediums of claim 9, wherein the ADCS algorithm is performed on the sink node.

12. The one or more non-transitory machine readable information storage mediums of claim 9, further configured to allow the use of multiple algorithms to cluster in order to achieve improved performance.

* * * * *